Sept. 6, 1932.   W. H. LOWE   1,876,331
VEHICLE BODY CONSTRUCTION
Filed Feb. 9, 1931
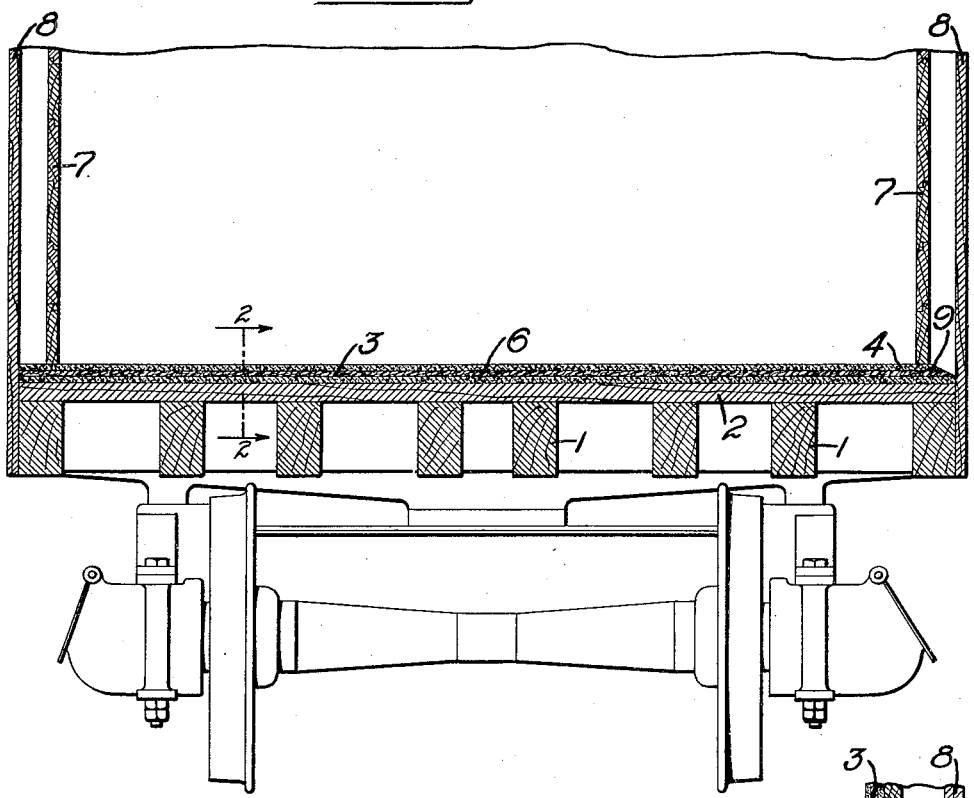
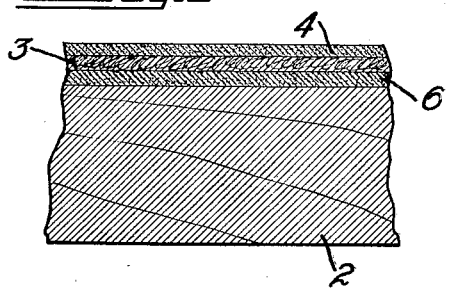
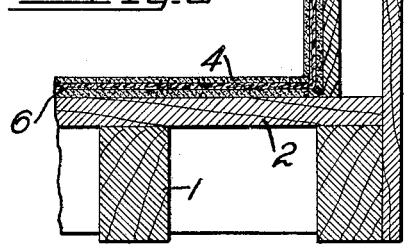
INVENTOR.
WILLIAM H. LOWE.
BY Charles S. Evans
HIS ATTORNEY Patented Sept. 6, 1932

1,876,331

UNITED STATES PATENT OFFICE

WILLIAM H. LOWE, OF SAN FRANCISCO, CALIFORNIA, ASSIGNOR TO THE PARAFFINE COMPANIES, INC., OF SAN FRANCISCO, CALIFORNIA, A CORPORATION OF DELAWARE

VEHICLE BODY CONSTRUCTION

Application filed February 9, 1931. Serial No. 514,497.

My invention relates to the construction of vehicle bodies, and particularly to the linings of these bodies such as the floor and inner sheathing construction.

It is among the objects of my invention to provide a vehicle body construction in which the lining will not be fractured by relative movements in the body caused by weaving or other internal vibrations.

Another object of my invention is to provide a vehicle body which will hold fine bulk loads, such as sand, pigments and grain without leakage.

Another object of my invention is the provision, in a vehicle body construction of the character described, of a wear-resisting lining.

Another object of my invention is to provide a vehicle body which may be easily cleaned.

Further objects of my invention include the provision, in a vehicle construction of the character described, of a lining which is resilient, non-decaying, waterproof, substantially inert chemically and a sound deadener.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a transverse vertical sectional view of the lower portions of a freight car, showing the vehicle body construction of my invention.

Figure 2 is a detail vertical sectional view taken in a plane indicated by the line 2—2 of Figure 1; the view being on a larger scale than that of Figure 1 to disclose the floor construction more clearly.

Figure 3 is a fragmentary vertical sectional view of a freight car showing a modification of the vehicle body construction of my invention.

In terms of broad inclusion, the vehicle body construction embodying my invention comprises a wearing sheet preferably adhesively united with the substructure, such as the floor and walls, of a vehicle body. The wearing sheet preferably comprises a fibrous layer saturated and coated with a mastic to render the sheet resilient and yieldable under stress to conform with relative movements in said body and slightly and slowly flowable under pressure to render it capable of coalescing after scarring. The saturating and coating mastic is preferably a bituminous material to form a tough integral mass, while at the same time possessed of the resilient, yieldable and coalescent characteristics pointed out.

While applicable to many types of vehicle bodies, the construction embodying my invention is particularly valuable in the lining, such as the floor and inner sheathing construction of freight cars. In this connection, the cars can be made to hold fine bulk loads such as sand, pigments and grain without leakage. Furthermore, the construction provides a lining surface which is wear-resisting, non-decaying, water-proof, substantially inert chemically, readily cleaned and which will not become fractured by relative movements in the car body caused by weaving or other internal vibrations.

In greater detail, Figure 1 shows an ordinary type of freight car in connection with which the preferred form of my invention is described; it being understood that the construction embodying my invention may be applied to equal advantage in other types of vehicle bodies. The trucks of the car selected for illustration form no part of this invention and will not be described.

In Figures 1 and 2 the construction of my invention is embodied in the floor structure of the car. In this case the floor boards 2 secured transversely across the longitudinally extending stringers 1 comprise the substructure over which a wearing sheet is laid. The wearing sheet is of a resilient material, and preferably comprises a fibrous layer 3 treated with a suitable mastic to render it yieldable under stress to conform with relative movements in the car body. Any suitable fibrous material may be used in the layer 3, and I have found it convenient to employ rag felt comprising 80% rag, 10% burlap, and 10% of another fibre such as redwood bark.

The mastic treatment of the fibrous layer 3 preferably comprises a saturation and coating with a bituminous compound. The saturating compound is preferably semi-solid at ordinary temperatures, so that the resultant mass of mastic and fibres presents a yieldable sheet having a marked degree of resilience. Over the upper surface of the saturated fibrous layer 3 is formed the coating 4; the bituminous compound in this case being solid at normal temperatures, preferably having a melting point at about 180° F. In this condition the bituminous coating 4 is slightly and slowly flowable to render it capable of coalescing after scarring.

When subjected to the impact of heavy objects, actual mechanical injuries may be inflicted in the surface of the coating 4. Ordinary cuts and injuries of minor character, however, quickly fill up and level over, due to the slow flowing of the saturating and coating materials under conditions of use, so that substantially an even and smooth surface is restored by wear.

The wearing sheet is preferably united to the substructure 2 by a layer 6 of bituminous cement, preferably a relatively hard steam blown asphalt dissolved in carbon bisulfide, benzole, or other suitable solvent. This layer penetrates into the underlying substructure to form a secure bond, and, since the top coating layer 4, saturated sheet 3 and cementing layer 6 are all adhesively united by the bitumen into an integral mass, the wearing sheet is securely bonded to the substructure.

The fibrous layer 3 with its semi-solid saturant forms a resilient cushion for the coating layer 4 and also serves to bind the entire wearing sheet together, so that the tangential forces applied to the top layer are distributed over a wide area where the cementing layer 6 joins the substructure 2, thus reducing the unit stresses on the bond between the wearing sheet and the substructure. The yieldable character of the sheet is particularly important in vehicle body constructions, due to the relative movements which occur in the bodies, because of weaving and other internal vibrations under conditions of use. The "give" or yield in the sheet allows it to conform with these relative movements to prevent rupture.

In Figure 1 the wearing sheet is shown extending beneath the inner sheathing 7 to the outer sheathing 8. Such construction is purely optional as the covering may end at the baseboard of the sheathing. Another variant construction is to have the covering material taper off as indicated by the line 9 on Figure 1 so that any moisture that seeps through the outer side wall sheathing will find a path out of, instead of into the car. This prevents damage to shipments such as sugar, lime cement etc., from sidewall seepage. Since the inner sheathing 7 of the cars is also subject to abrasion, chemical contamination, and conditions of moisture it is advantageous at times to cover that part of the car in the manner of my invention. Such construction is shown in Figure 3, in which the wearing sheet extends up on the sheathing 7.

It will be noted that this type of covering can be readily repaired, if there is a bad break, by simply cutting out the damaged part and fixing on new material which quickly bonds with that already there. When constructed in accordance with my invention, a car may be cleaned with a hose in a few minutes and be ready to receive a cargo no matter what the previous shipment may have been; whereas with the wooden lined cars it is necessary to sweep the car carefully and then perhaps line it with paper to prevent leakage and contamination of the new cargo.

This covering of my invention effects great savings in floor maintenance costs and in the matter of cleaning cars and preparing them to receive shipments. To give an idea of the magnitude of the possible savings it may be noted that one road has checked the operation of cars embodying my invention and report a reduction from $3.50 to $1.00 for each time the car was cleaned and prepared for shipment; and that over a period of seven months the cars using my invention suffered one-tenth of one per cent as much floor damage as the wooden floor cars in the same service.

The body construction of my invention insures a waterproof car, and prevents water, thrown up against the bottom of the car by the wheels, and by other splashing, from seeping through the floor and walls and damaging the contents of the car. Furthermore, the lining in the car construction is decay-proof, substantially inert chemically and a sound deadener.

My invention is also particularly applicable to passenger coaches, baggage cars, street cars, livestock and poultry cars, motor buses, trucks and other vehicles subject to weaving in the frame and destructive traffic on the surfaces.

I claim:

1. A freight car comprising a plurality of stringers, floor boards overlying said stringers, an outer sheathing extending upwardly adjacent the ends of said floor boards, a sheathing spaced inwardly of said outer sheathing, and a waterproof wearing sheet secured over the floor boards and extending under the inner sheathing to abut against the outer sheathing, the edges of said sheet being tapered off between said sheathings.

2. A freight car comprising a plurality of stringers, floor boards overlying said stringers, an inner wall sheathing extending upwardly adjacent the ends of said floor boards, and a wearing sheet adhesively secured to and completely covering said floor boards and wall sheathing and comprising a fibrous layer saturated with a semi-solid bituminous material to render the sheet yieldable under stress to conform with relative movements in the sheet supporting structure.

3. A freight car comprising a plurality of stringers, floor boards overlying said stringers, an inner wall sheathing extending upwardly adjacent the ends of said floor boards; a wearing sheet completely covering the floor boards and wall sheathing and comprising a fibrous layer saturated with a semi-solid bituminous material to render the sheet yieldable under stress to conform with relative movements in the floor and wall sheathing, and a coating of bituminous material slightly and slowly flowable under pressure over said saturated layer to render the exposed surface of the wearing sheet capable of coalescing after scarring; and a bituminous cement adhesively uniting the wearing sheet to the floor boards and to the wall sheathing.

In testimony whereof, I have hereunto set my hand.

WILLIAM H. LOWE.